Figure 17:
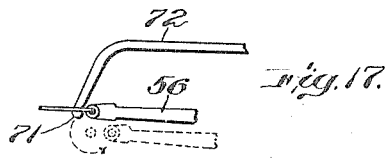

H. A. BALLARD.
LOCK STITCH SHOE SEWING MACHINE.
APPLICATION FILED AUG. 21, 1906.
1,098,874.
Patented June 2, 1914.
8 SHEETS—SHEET 1.
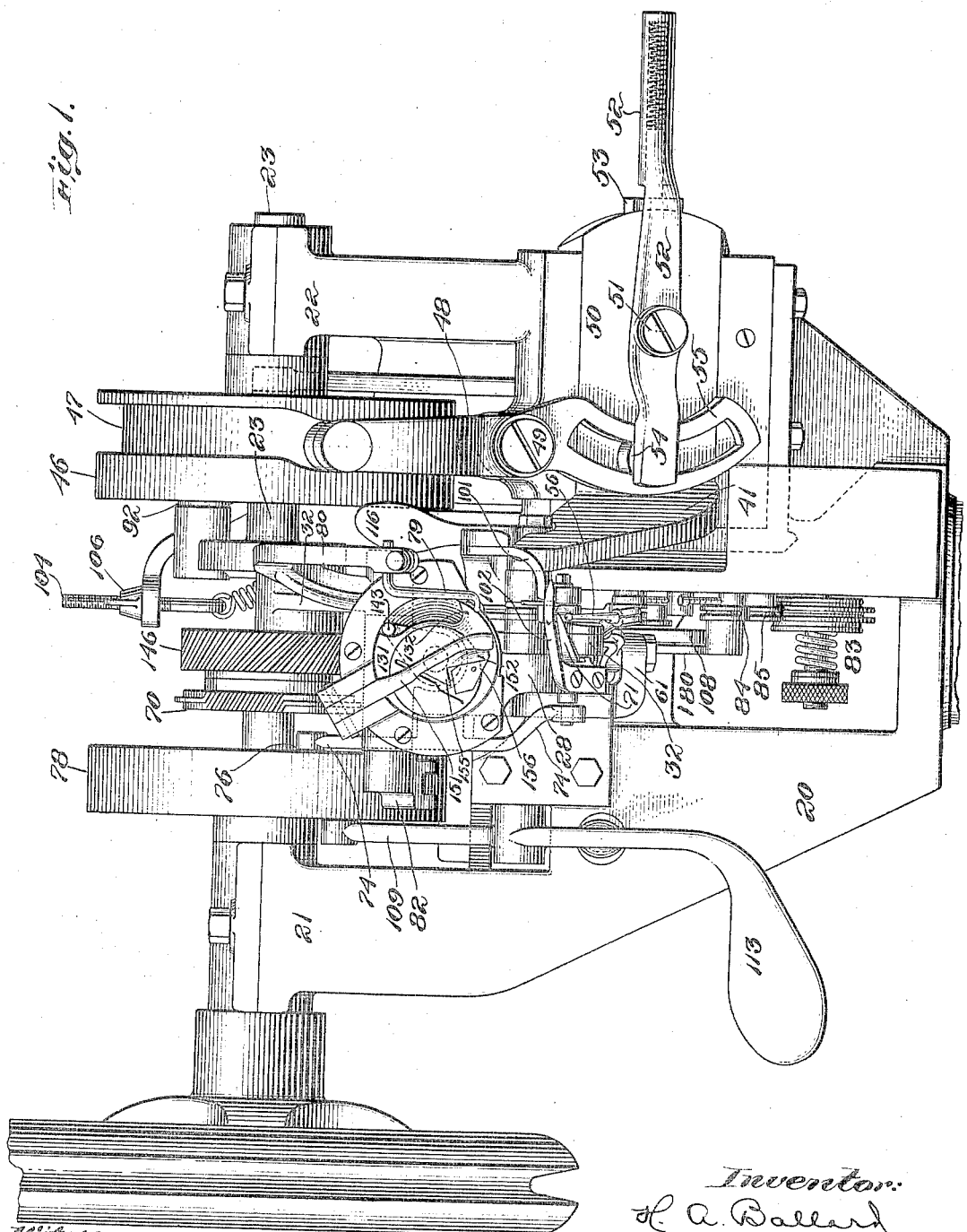

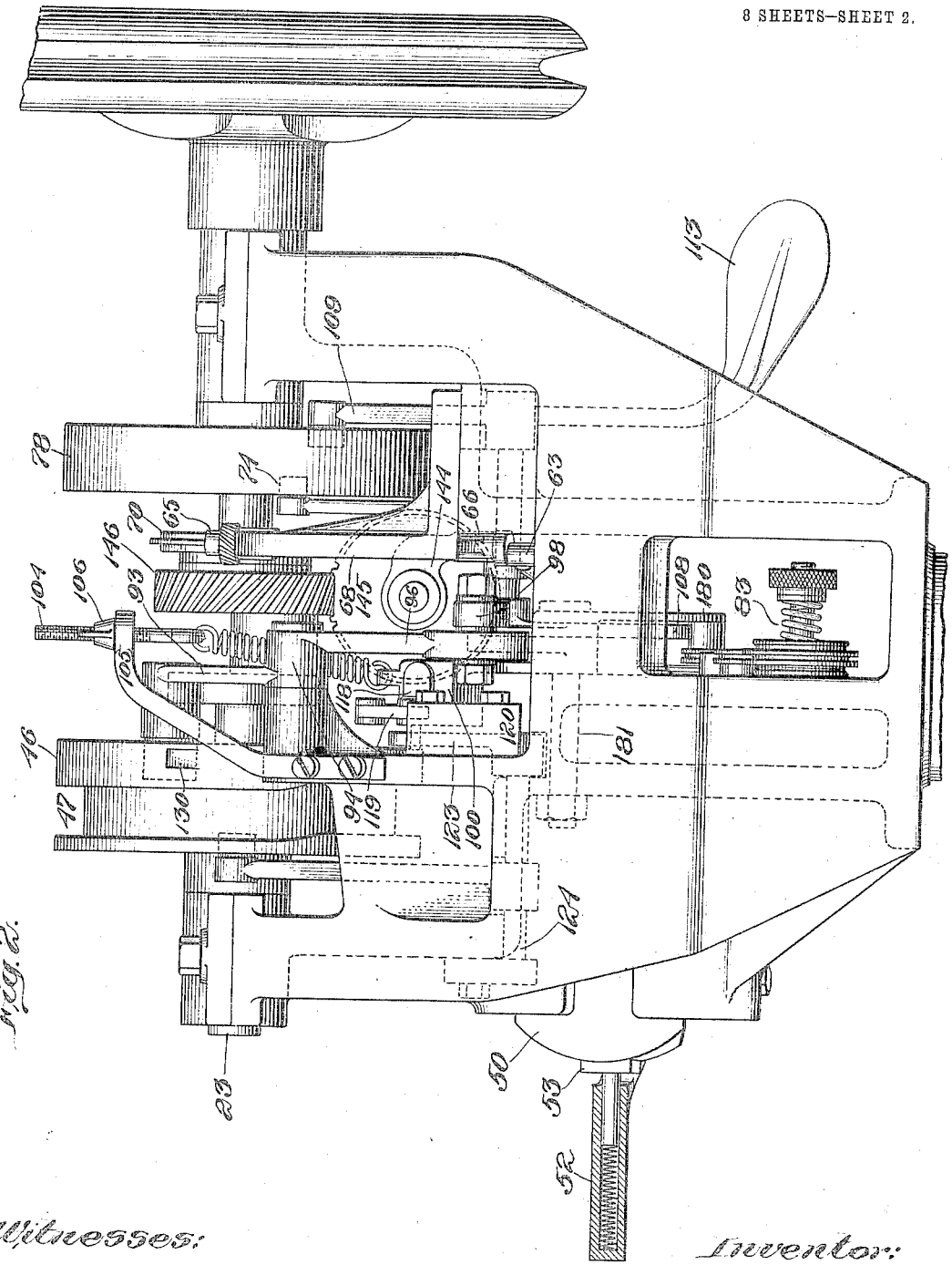

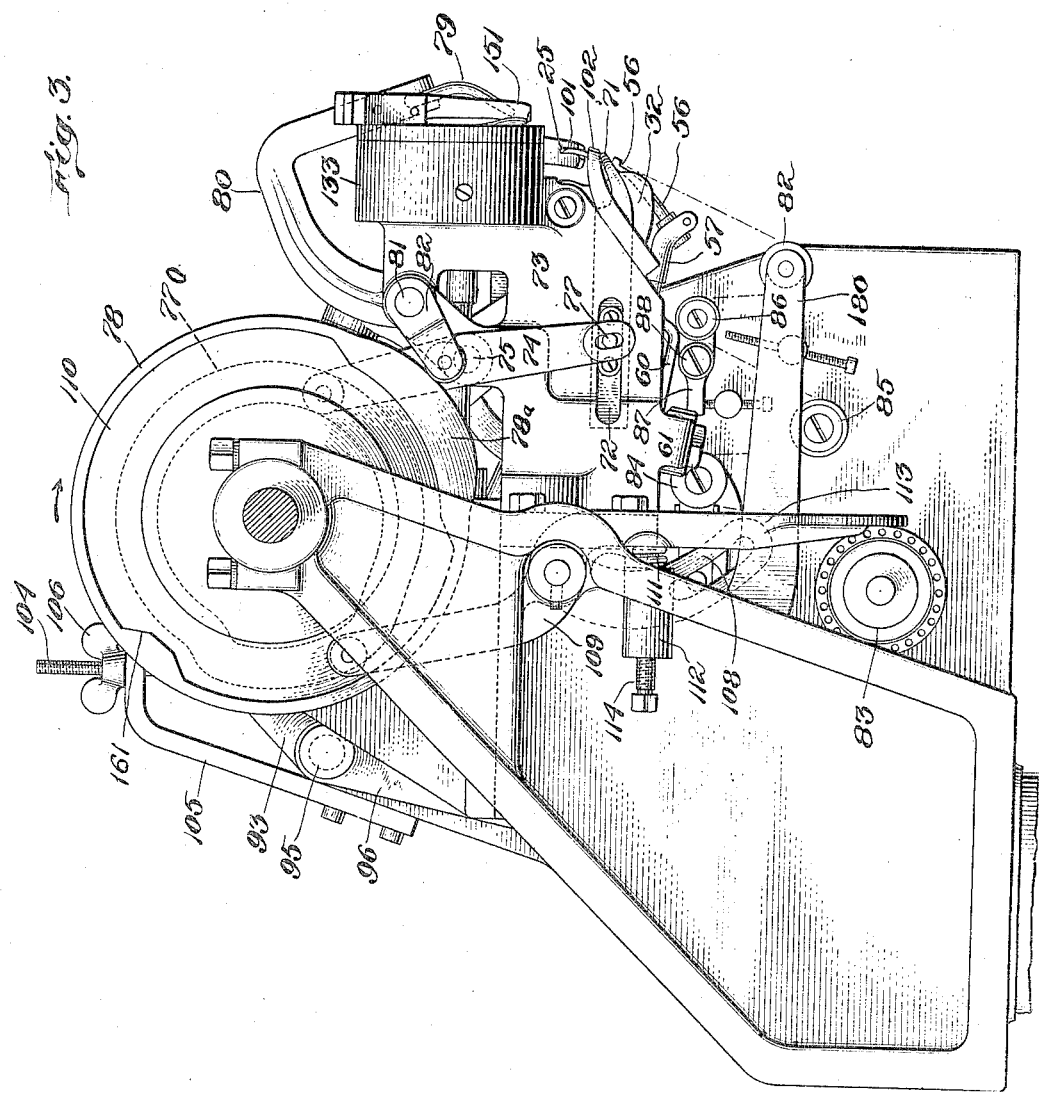

H. A. BALLARD.
LOCK STITCH SHOE SEWING MACHINE.
APPLICATION FILED AUG. 21, 1906.
1,098,874.
Patented June 2, 1914.
8 SHEETS—SHEET 4.
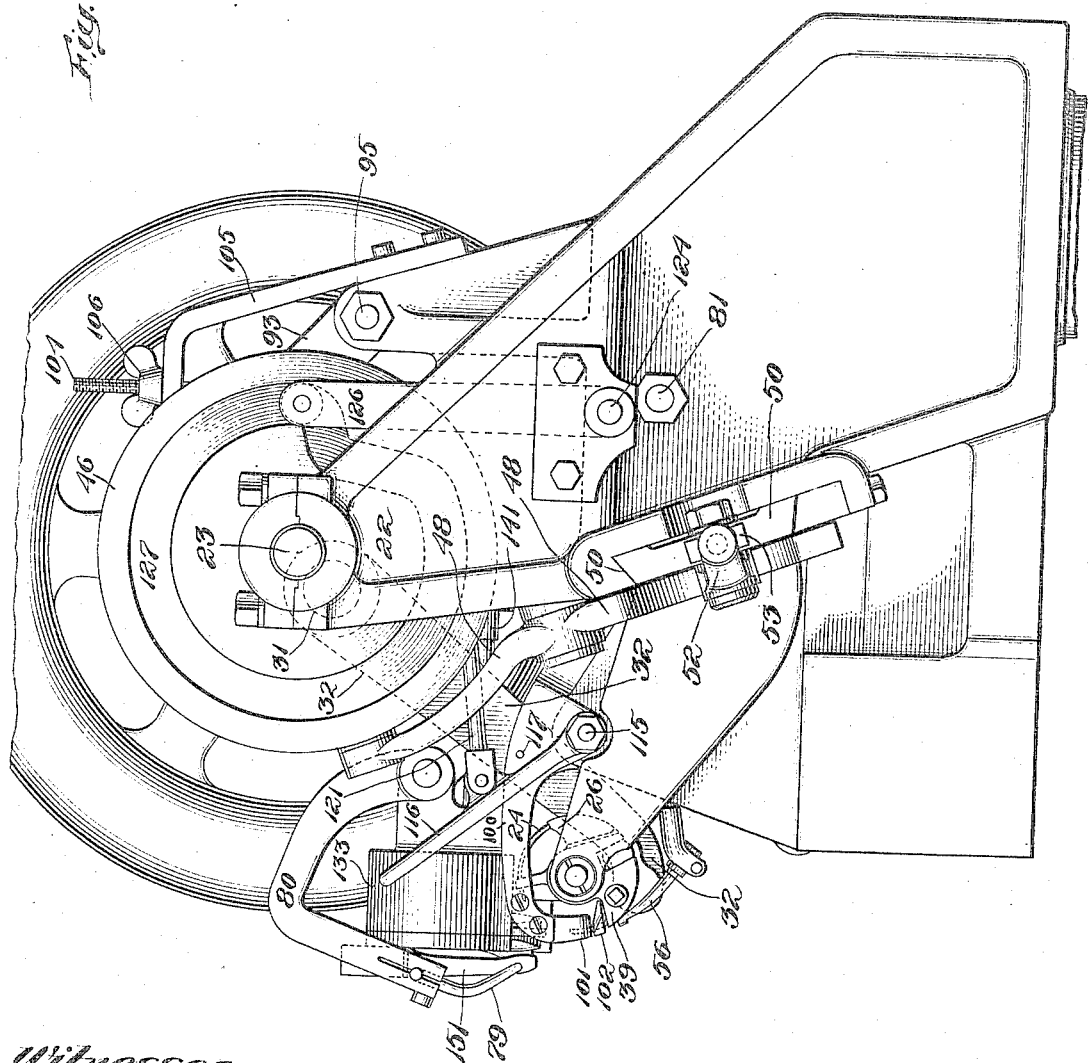

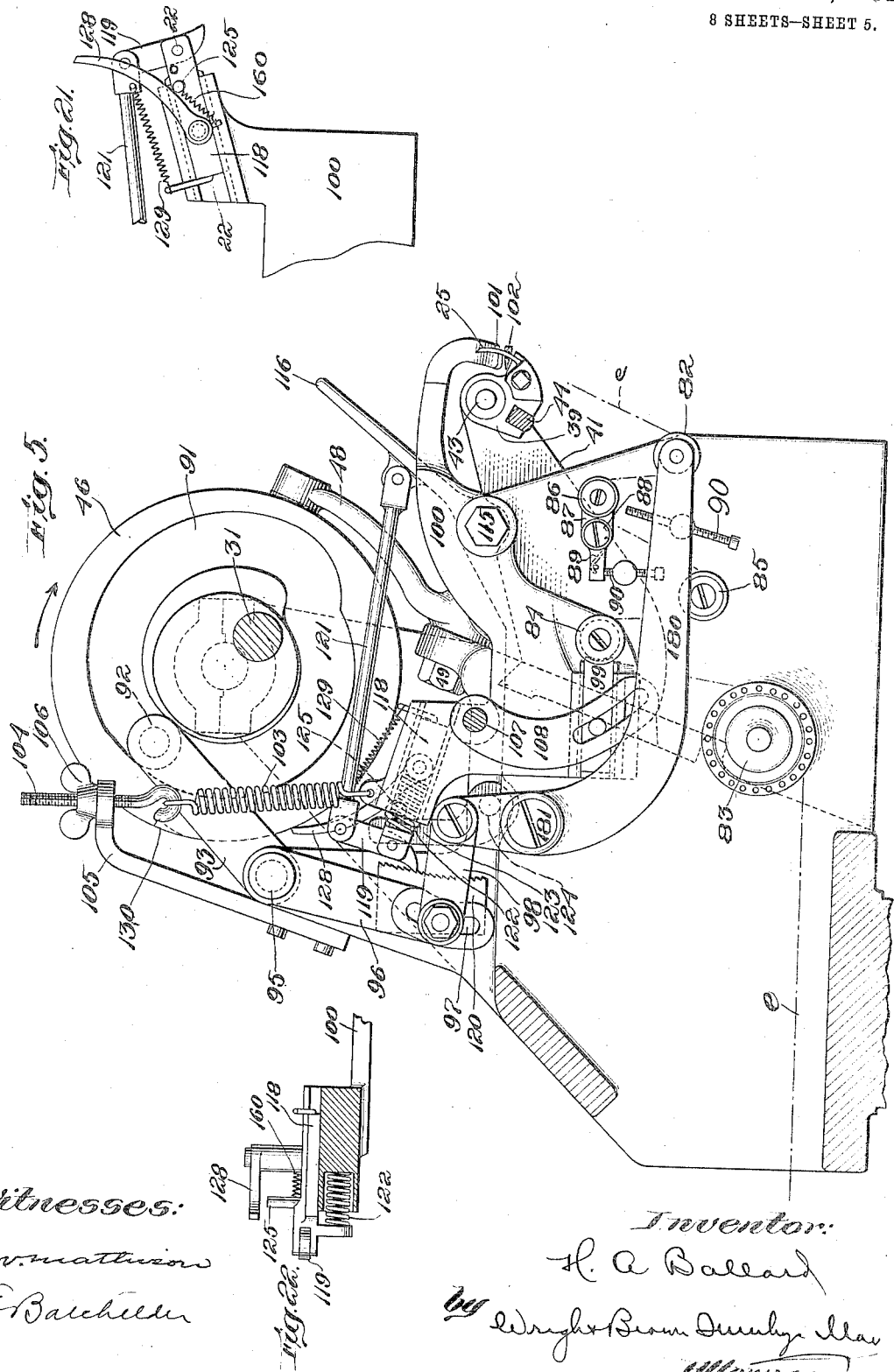

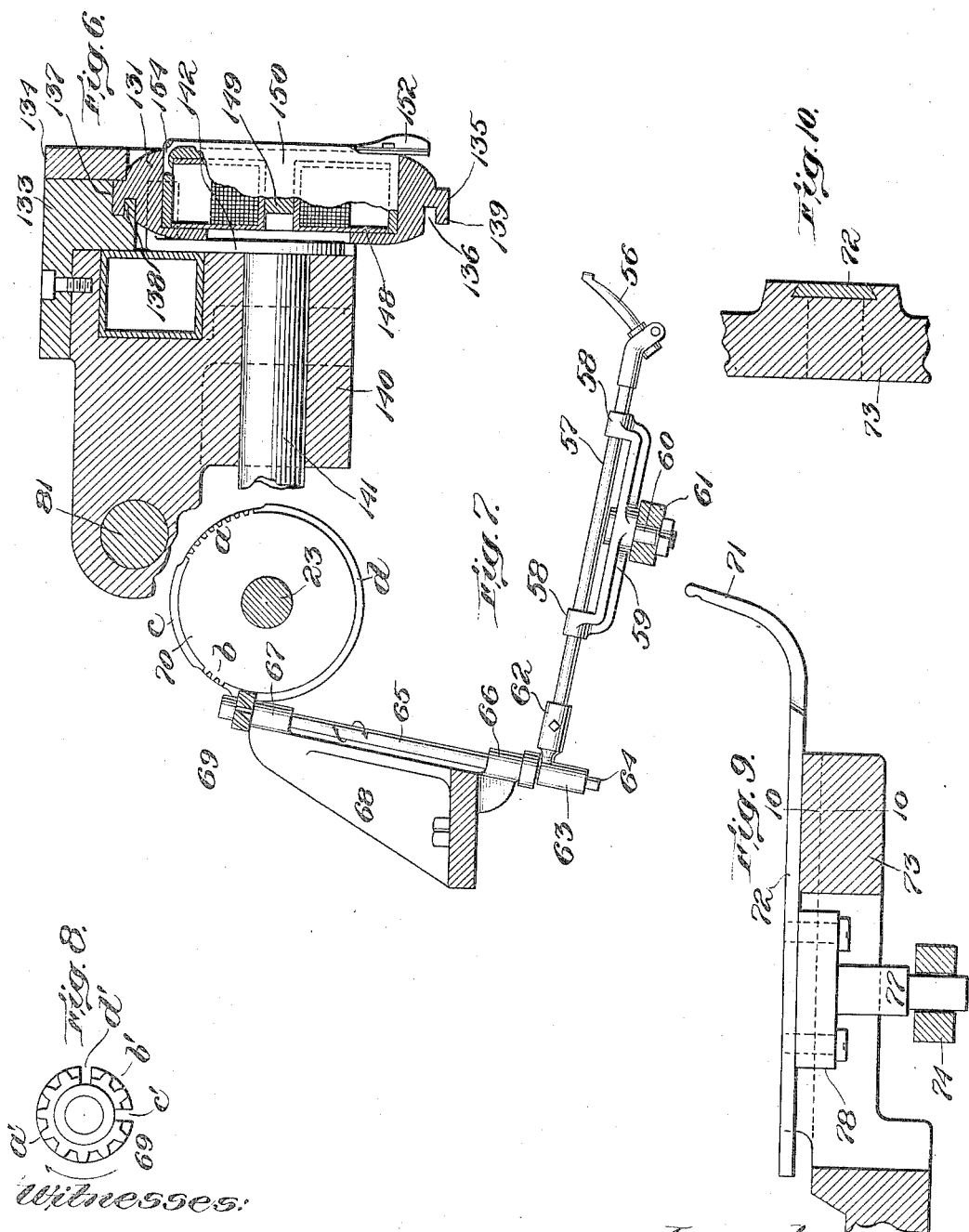

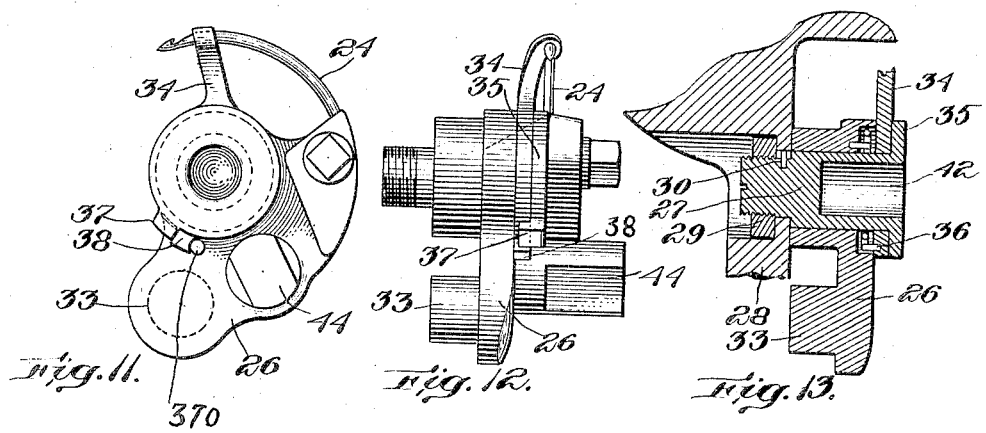
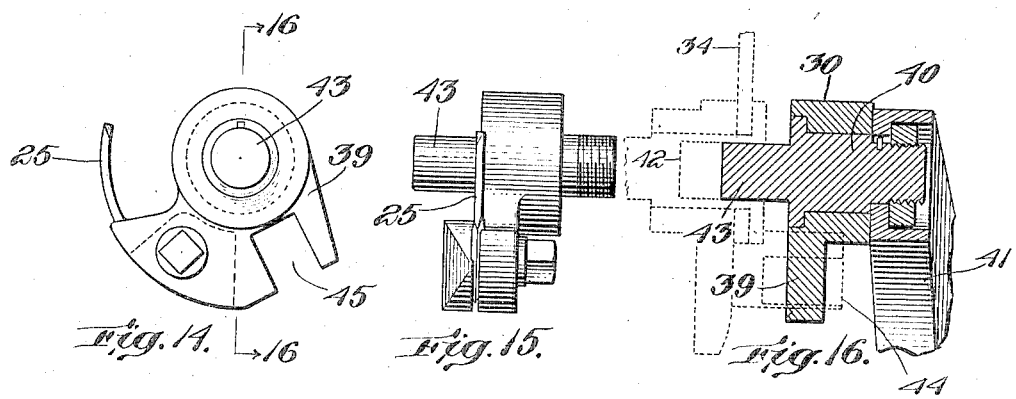

H. A. BALLARD.
LOCK STITCH SHOE SEWING MACHINE.
APPLICATION FILED AUG. 21, 1906.

1,098,874.

Patented June 2, 1914.
8 SHEETS—SHEET 8.

UNITED STATES PATENT OFFICE.

HARRIE A. BALLARD, OF SOMERVILLE, MASSACHUSETTS, ASSIGNOR TO THE BOYLSTON MANUFACTURING COMPANY, OF BOSTON, MASSACHUSETTS, A CORPORATION OF NEW JERSEY.

LOCK-STITCH SHOE-SEWING MACHINE.

1,098,874.      Specification of Letters Patent.     Patented June 2, 1914.

Application filed August 21, 1906. Serial No. 331,529.

*To all whom it may concern:*

Be it known that I, HARRIE A. BALLARD, of Somerville, in the county of Middlesex and State of Massachusetts, have invented certain new and useful Improvements in Lock-Stitch Shoe-Sewing Machines, of which the following is a specification.

This invention has relation to lock-stitch sewing machines of the character of those for sewing together the parts of a boot or shoe with hot wax thread.

The object of the invention is to provide certain improvements in machines of the character referred to and the character of these improvements will appear from the following specification and claims, and the drawings which form a part hereof.

Referring to the said drawings,—Figure 1 represents in front elevation a hot wax lock-thread stitcher embodying my invention. Fig. 2 represents a rear elevation of the same. Fig. 3 represents a side elevation of the machine looking from the left-hand side. Fig. 4 represents a side elevation looking from the right-hand side. Fig. 5 represents a vertical longitudinal section through the machine. Fig. 6 represents in detail and in vertical section the shuttle and the adjacent parts. Fig. 7 represents in detail the looper and its actuating mechanism. Fig. 8 represents one of the driving gears for the looper. Fig. 9 represents in horizontal section the thread-finger and its carrier. Fig. 10 represents a vertical section through the same on the line 10—10 of Fig. 9. Fig. 11 represents the needle and its carrier, the same being shown in side elevation. Fig. 12 represents a front elevation of the same parts. Fig. 13 represents a longitudinal section through the same. Fig. 14 represents a side elevation of the awl and its carrier. Fig. 15 represents a front elevation of the same. Fig. 16 represents a section on the line 16—16 of Fig. 14. Figs. 17, 18, 19 and 20 illustrate the operation of the needle, the awl, the loop-opener, and the thread-finger. Figs. 21 and 22 illustrate details of construction of the lock for the presser foot.

The machine is provided with a conveniently shaped head adapted to receive and support the various operative instrumentalities. It is indicated as a whole at 20 and is provided with uprights 21, 22 to serve as bearings for a combined cam and crank shaft 23 from which power is transmitted to the operative parts of the machine.

*The needle, the awl and their operating mechanism.*—The needle and the awl are indicated respectively at 24 and 25. The needle-carrier 26 (see Figs. 11 to 13) is journaled upon a stud 27 which is secured to a forwardly projecting bracket 28 on the head. Preferably the stud is threaded at its end as illustrated in Fig. 13 to receive a nut 29, the said nut coöperating with a shoulder on the stud to clamp it rigidly to the projecting portion 28 of the head. The stud is further held against rotation by a key 30. The needle is clamped to the carrier in any convenient manner and the carrier itself is oscillated about the stud by a suitable mechanism which will conveniently include a crank 31 on the shaft 23 and a pitman 32 connecting said crank with a pin 33 on the carrier 26. The crank and the pitman are shown in dotted lines in Fig. 4. A needle guide or strengthener 34 of any convenient form may be employed, in which event it may be located between a flange 35 on the stud, and the confronting face of the carrier 26. Lateral movement of the needle-carrier is prevented by the confronting faces of the flange 35 and bracket 28. It is moved in one direction by a spring 36, and in the other direction by a pin 370 on the needle carrier which engages a complemental lug 38 projecting from the hub of the needle guide or strengthener. A lug 37 on the flange 35 limits the movement of the needle guide when the needle is retracted. The spiral spring 36 is placed in a socket in the carrier 26, and has one end attached to said carrier, and the other end to needle guide or strengthener 34.

The awl 25 is suitably secured on the awl-carrier 39 which is journaled upon a stud 40. The stud 40 is attached to an arm 41 which may be moved by mechanism, to be explained, in lines parallel with the axis of movement of the awl, for the purpose of feeding the work. Means, similar to that employed for securing the stud 27 in place, comprising a nut screwed on the threaded end of the stud 40 and engaging said arm, may be utilized for attaching the stud 40 to the arm 41. The stud 27 and the stud 40 are arranged in axial alinement and they are provided respectively with a telescopic pin and a socket to preserve their alinement. The socket for convenience may be formed in the stud 27 as indicated at 42, and the pin 43 may be formed on the end of the stud 40. By this construction and arrangement of parts, it is impossible for the awl and the needle to get out of axial alinement, each stud being supported in part by the other as well as by the means for attaching it to its proper support. The awl-carrier and the needle-carrier are oscillated by the same operating means, there being a pin and slot connection between them for obtaining this end. The pin is illustrated in the present embodiment of the invention as being attached to the carrier 26 and is indicated at 44. Its sides are flattened or cut away so as to extend into a complemental slot 45 formed in the awl-carrier 39. The pin 40 is of adequate length to permit the lateral motion of the awl-carrier without disengagement with the slot 45. By virtue of this construction and arrangement, the oscillation of the awl and the needle is effected by the crank 31 and pitman 32. The supporting arm 41 is reciprocated laterally; and the awl carrier, being confined between confronting faces of said arm and of the stud 40 respectively, partakes of such lateral movement to feed the work.

The mechanism for effecting the lateral movement of the awl comprises a cam-disk 46 having a peripheral cam groove 47, and a lever 48 fulcrumed at 49 and connected with the slide 50 on which is formed the arm 41. The slide 50 has beveled sides and it is mounted in a dovetailed groove formed in the front of the head. Fulcrumed at 51 on the front face of the slide is a handle lever 52 adapted to be maintained in any position to which it may be adjusted by a friction block 53. The inner end of the lever carries a roll 54 located in a curvilinear slot 55 in the lever 48. When the slotted portion of the lever 48 is at its extreme limit of movement to the left, the slot 55 is concentric with the axis of oscillation of the lever 52, so that the awl-carrier will always be moved to the same point nearest the needle-carrier irrespective of the adjustment of the lever 52, although the total distance to which the awl-carrier is moved may be varied by adjusting the roll 54 in the slot 55.

*The looper mechanism.*—The looper is indicated at 56 (see Figs. 3 and 7). It is secured upon the end of a rod 57, longitudinally movable in guides 58 formed on the ends of a yoke 59. The yoke is fulcrumed upon a pin 60 attached to a bracket arm 61 in front of the head as illustrated in Fig. 1. The rod 57 may be swung about the pin 60 as a fulcrum, and it may also be moved longitudinally relatively to the yoke by means of the following mechanism: The rear end of the rod is secured to a socket 62 formed on or secured to a sleeve 63 through which passes a crank pin 64 on the end of a shaft 65. The shaft is journaled in bearings 66, 67 on a bracket 68 attached to the head at the rear thereof as shown in Fig. 2. The upper end of the shaft 65 is equipped with a mutilated spiral gear 69 which intermeshes with and is driven by a complemental driving gear 70 on the shaft 23 (see Figs. 1, 2 and 7). These two gears 69 and 70 are so formed that the looper is first moved from the full line position in Fig. 17 to the dotted line position to lay the thread on the needle, where it pauses and is thereafter moved from the dotted line position in the direction of the arrow to the full line position. To accomplish this end, the gear 70 is provided with two series of teeth indicated respectively at $a$ and $b$ (see Fig. 7) adapted to respectively engage the series of teeth $a'$ and $b'$ on the gear 69. Between said series of teeth $a$ and $b$, the driving gear 70 has circumferential ribs $c$ and $d$ which are adapted to enter complemental grooves $c'$ and $d'$ in the gear 69, so that during that portion of the rotation of the gear 70 in which the teeth $a$ and $b$ are disengaged from the teeth $a'$ $b'$, the gear 69 is held against rotation.

Figure 18:
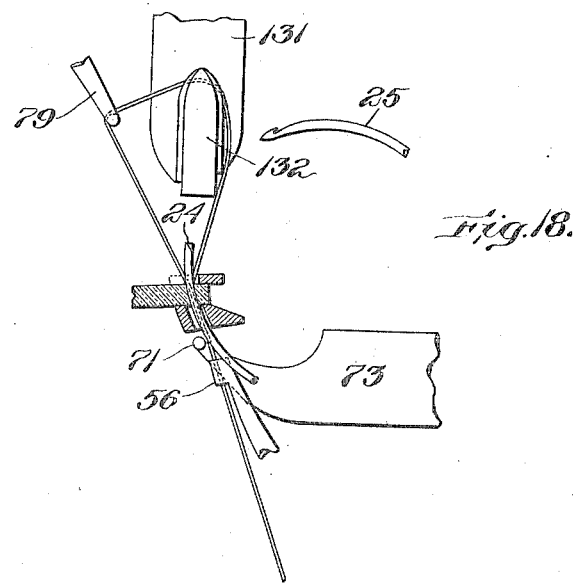
Figure 19:
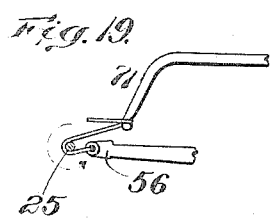
Figure 20:
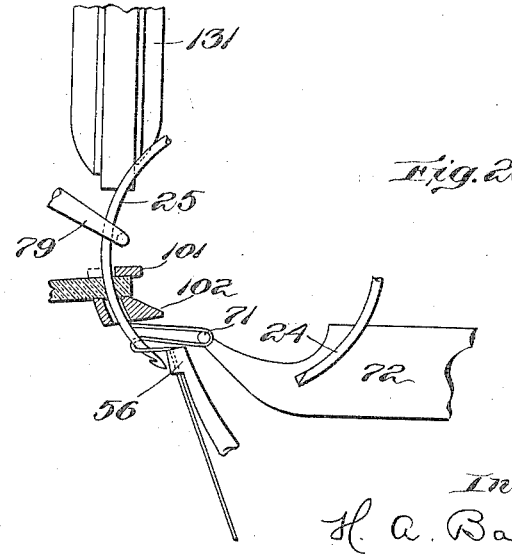

*The thread-finger.*—The thread-finger which is utilized for placing the needle thread upon the needle in such location that, when the needle draws the said thread through the work, the thread will not be rendered or cut by the barb, is indicated at 71 (see Figs. 3, 9, 10, 18 and 20). This finger is formed on a slide 72, fitting in a dovetail groove in a bracket or forwardly projecting portion 73 on the head at the left side thereof. The finger is located below the work as shown in Figs. 18 and 20. It is reciprocated at proper intervals by a two-armed lever 74, fulcrumed at 75. The lower end of said arm has a pin and slot connection with the slide 72, and the upper end of said lever carries a roll 76 extending into a cam-path 770 in a cam-disk 78 secured to the main shaft 23. The pin and slot connection between the lever 74 and the slide 72 is best illustrated in Fig. 9. It will be observed from said figure that the bracket 73 is slotted to receive the pin 77 which projects from a block 78 attached to the slide by suitable fastening devices. The operation of the thread-finger is illustrated in Figs. 18, 19 and 20. It normally lies in position shown in Fig. 18 in front of the path of movement of the awl and needle and in front of the thread as it extends through the looper. When the looper has traversed the initial part of its movement, the thread-finger engages the thread and is moved rearwardly so as to measure off a predetermined length of thread which is always the same, being just enough to accommodate the travel of the needle, the thread-finger moving from the position shown in Fig. 17 to the position shown in Fig. 19. The looper therefore lays the thread properly in the barb of the needle.

*The loop-spreader.*—That instrumentality which effects the opening or spreading of the loop of needle-thread so that it may be properly engaged by the hook on the shuttle and which I have termed the "loop-spreader", is indicated at 79 (see Figs. 1, 3, 4, 18 and 20). It consists of a hooked finger, the upper end of which is bent at an angle and is clamped adjustably in the end of an arm 80. This arm is bent at an angle as shown in Fig. 3 and is also slightly curved, its rear end being secured to a rock-shaft 81, journaled in the front of the head in the rear of the shuttle casing. A short arm 82 is attached to the rock-shaft 81 and has a roller bearing against the periphery of the cam-disk 78, which has a cam rise 78ª. After the needle has drawn the loop of needle-thread through the work, the loop-spreader engages it as shown in Fig. 18 and spreads the loop so that the hook of the shuttle may enter therein as shown in Fig. 18.

*The takeup.*—The takeup mechanism is illustrated in Figs. 3 and 5. It comprises a curved two-armed lever 180, which is fulcrumed upon a stud 181 passes into the head of the machine. On its free end, the takeup arm has a guide-roller 82. The thread, which is indicated by the dotted line *e*, passes around the spring tension device 83, thence upward and over a guide roll 84 (which, as hereinafter explained, constitutes one member of the thread locking clamp), thence downward and under a loose guide roll 85, thence upward and over a guide roll 86, and thence downward and under said takeup roll 82. The roll 86 is loosely journaled on what may be termed an auxiliary takeup arm 87, fulcrumed upon a stud 88. There is a spring 89 which normally holds the roll 86 yieldingly at its limit of movement and there are adjustable stops 90 90 which limit the movement of the front end of the auxiliary takeup. The takeup lever 80 has an unvarying path of movement and is oscillated about the stud 181 by the following devices: The cam disk 46 is provided on its inner face with a cam groove 91 to receive a roller 92 on the free end of an arm 93. The arm projects upwardly from a hub 94 pivoted upon a fulcruming stud 95. Projecting downwardly from said hub is another arm 96, the two arms 93, 96 constituting a two-armed lever. The free end of the arm 96 is provided with a curved slot 97 so that there may be adjustably attached thereto a link 98 pivoted to the short upwardly projecting arm of the takeup lever 80. By this mechanism, the takeup lever may be oscillated and at the same time it may be adjusted relatively to the actuating lever 93, 96. It will always rise to the same point but will descend to different points according to the adjustment.

*The thread-lock and presser foot.*—The thread-lock and the presser foot are so combined and related that the position of the locking members is controlled by the thickness of the work through the medium of the presser foot which rests against it. In the present embodiment of the invention, the thread-lock is mounted directly upon the presser foot lever in the rear of its fulcrum, so that when the front end of the presser foot is raised by an extra thickness of the work, the thread-lock is dropped to give up a proportionate amount of thread to the stitch setting mechanism to be described, and when the presser foot is lowered as the work decreases in thickness the thread lock is moved to retract or take up a proportionate amount of thread. The mechanism for locking the needle-thread comprises the roll 84 which constitutes one clamp member, and a slide 99 which constitutes the other clamp member and which is adapted to move in guides afforded for the purpose. These two members are mounted upon the rear end of the presser foot lever which is indicated as a whole at 100. To the front end of this lever is attached the presser foot 101 (see Fig. 1) which coöperates with the work-rest 102. The work-rest is suitably attached to a forwardly projecting portion of the head and is provided with a slot to receive the awl and the needle. The presserfoot is held yieldingly upon the work by a spring 103, one end of which is attached to the rear end of the lever 100 and the other end of which is attached to a screw-hook 104 passing through a support 105 at the rear of the machine and adjustable relatively thereto by means of a wing nut 106.

Referring once more to the work clamping or locking mechanism, it will be observed from Figs. 3 and 5 that journaled in the head is a rock-shaft 107 to which is secured a curved arm 108 having a pin and slot connection with the clamp member 99. The said shaft 107 has likewise attached to it an arm 109, carrying at its free end a roller engaging a cam-path 110 in the cam-disk 78. A spring 111 is arranged in a socket 112 and bears against a handle 113 which forms a downward extension of the arm 109, so as to hold the roller on the arm 109 against the outer surface or wall of its cam-path. The tension of the spring may be increased or diminished by any suitable means including a screw 114. By means of the lever arms 109, 108 and the cam-path 110, the clamp member 99 will be at the proper intervals forced against the roll 84 so as temporarily to lock the thread between the takeup and the source of supply. The inner wall of the cam-path 110 is substantially cylindrical so that, even though the thread be locked, the operator, by forcing the lever 113 rearwardly, may rock the shaft 107 sufficiently to carry the clamping or locking member 99 away from its complemental member and release the thread. The cam-path 110 has a projection 161, by which the thread-clamp is unlocked as hereinafter described.

Although the presser foot, as previously stated, is held yieldingly upon the work, nevertheless I provide for its being positively locked against movement when it is in its active position upon the work, together with means for unlocking it either manually or at predetermined times in the cycle of operation of the machine. The presserfoot-lever 100 is fulcrumed upon a stud 115 and likewise pivoted upon said stud is a handle 116. This handle is adapted to be moved rearwardly by the operator, and, when so moved, to engage a pin 117 (see Fig. 4) on the presserfoot-lever and thus rock said lever about the said stud 115. On the rear end of the presserfoot-lever 100 there is a socket to receive a compression spring 122. This spring bears against the bent end of a slide 118 arranged to move in guideways on one side of the lever. Pivoted to the said slide 118, in lugs formed on the end thereof, is a pawl 119 adapted to engage the teeth of a ratchet plate 120 (shown in rear elevation in Fig. 2). The upper end of the pawl 119 is connected to the lever 116 by connecting rod 121, which is held yieldingly forward by a spring 129. When the operator moves the lever 116, he disengages the pawl from the ratchet plate, and by further movement of said lever, swings the presserfoot upwardly, it now being unlocked. When the lever 116 is in its normal position, as shown in Fig. 5, the spring 122 forces the slide 118 out far enough so that the end of the pawl will engage the ratchet plate and thus lock the presserfoot against upward movement. In order, however, that the presserfoot may be unlocked during the feeding of the work, I provide a lever-arm 123 secured to a rockshaft 124 as shown in Figs. 4 and 5. This arm is adapted to engage at its free end a pin 125, shown in dotted lines in Fig. 5, projecting from the slide 118. Likewise affixed to the shaft 124 is another lever-arm 126, having at its free end a roller located in a cam-path 127 in the cam-disk 46. Immediately prior to the feed of the work, the lever-arms 126, 123 are rocked to force the slide 118 in position to disengage the pawl from the ratchet plate so as to release the presserfoot from the work. When the machine comes to a state of rest, I desire to effect the unlocking of the presserfoot-lever and to lift the presserfoot-lever so as to free the work and I accomplish this end by the following mechanism: Pivoted to the slide 118 is a finger or pawl 128 which is caused by spring 160 to bear against the periphery of the cam-disk 46. In the periphery of the cam-disk there is a notch 130. Inasmuch as the shaft and the cams thereon rotate in the direction of the arrow in Fig. 5, the notch will slide beneath the end of the pawl 128 without having any effect thereupon. When the machine is stopped, however, by any suitable stopping mechanism, it comes to a state of rest with the awl at or near its highest point. Then by manually reversing the rotation of the shaft 23, the awl is lowered to a point where it is free from the work, and at the same time the wall of the notch 130 forces the pawl 128 downwardly and rearwardly to first disengage the locking pawl 119 from the ratchet plate 120 and then to depress the rear end of the presserfoot-lever so as to raise the presserfoot and free the work. At the same time the thread is unlocked by the cam projection 161 opening the clamp.

*Shuttle and shuttle-driving mechanism.*— As illustrated in Figs. 1, 3, 4 and 6, the shuttle 131 is of the discoidal rotatory type. It is provided with a hook 132. It is mounted in a semi-circular casing consisting of two members 133, 134 secured together by screws or other fastenings as shown in Fig. 1. It will be observed that the shuttle is formed with the circumferential rib 135 and that the inner face of said rib is undercut as at 136. The rib fits in a groove 137 in the casing and the member 133 of the casing has a lip or flange 138 which extends into the groove 136. The lip 139 on the shuttle, produced by the formation of the groove 136, over-laps the lip 138 and these two laterally extending, interlocking, over-lapping lips support the shuttle at all times during its rotation so that its axis of rotation is unvaried. Heretofore it has been possible for the shuttle to drop bodily to some extent relatively to its casing when the hook projects between the ends of the semi-circular casing. With this construction, however, the shuttle is maintained in an unvarying position with respect to the casing. The hook of the shuttle, as is usual, is formed by cutting away a portion of the shuttle so that the hook may enter the loop of the needle-thread when the latter is held in the position shown in Fig. 18, and carry the loop with it during its rotation so that said loop will be caused to encircle the shuttle-thread. The shuttle-casing is rigidly secured to a convenient portion 140 of the head so that the axis of the shuttle is to the left of the needle in such position that the hook may properly engage the needle-thread. By means of the driving mechanism, now to be explained, the shuttle is rotated once for each reciprocation of the needle.

The shuttle-driver consists of a shaft 141 having on its end an arm 142 with a shuttle-engaging finger 143 projecting into the cut away portion of the shuttle and bearing against a shoulder thereon. This shaft is journaled in a portion 140 of the head and also in a bracket 144 (see Fig. 2) and is arranged concentrically with relation to the axis of the shuttle. On its rear end the shuttle-driving shaft 141 is provided with a spiral gear 145 intermeshing with and being driven by a spiral gear 146 on the main shaft 23. The two spiral gears 146 and 145 are of the same diameter and have the same number of teeth, in consequence of which the shuttle-driving shaft is rotated synchronously with the main driving shaft.

The bobbin for the shuttle-thread is illustrated at 148 in Fig. 6. It is journaled on a spindle 149 which projects inwardly from a cover 150. This cover is in the form of a cup and is adapted to be inserted in the usual socket formed eccentrically in the front face of the shuttle. The cover is held in place by an arm 151 (see Fig. 1), which is pivoted between lugs formed on the shuttle-casing and is adapted to be locked in position by a pin. The end of the arm 151 engages a protuberance 152 on the cover so as to hold it against rotation. The thread on the bobbin passes outward through an aperture 154, thence downward and under a projecting corner 155 and under a tension device 156. The shuttle is employed to set the stitch and then to draw out sufficient thread for the next stitch, and the thread-lock is therefore closed to lock the thread during the first portion of the thread pulling movement of the shuttle, after which it is opened to release the thread as the shuttle completes its thread pulling movement. In view of this operation, the take-up lever is not depended upon to set the stitch, but is employed for taking up the slack in the needle thread as it is released by the shuttle. By adjusting the cam 78 upon the main shaft, the timing of the thread-lock may be varied to cause it to operate at the exact point in the cycle of operations that is found to be desirable.

*Operation.*—It may be assumed that the machine will be equipped with suitable belt-driving mechanism and with proper starting and stopping mechanism.

The operation of the machine is as follows: The work being inserted in the machine between the work-rest and the presserfoot, the machine is set in motion. The awl penetrates the work and feeds it in the proper direction, the presserfoot being automatically released to permit the feeding to take place. As soon as the feeding is accomplished, the presserfoot is locked and the awl is withdrawn. The needle enters the aperture formed by the awl. Then the thread-finger is drawn rearwardly from the position shown in Fig. 17 to the position shown in Figs. 19 and 20, and at the same time the takeup lever moves upward to deliver thread to the looper and the thread-finger, and the looper starts from the position shown in full lines Fig. 17 and traverses the path indicated by the dotted arrow in Fig. 17 until it reaches the position shown in Fig. 19 where it pauses; this all occurring simultaneously. During this time the thread clamp has been operated to lock the thread. As the needle moves upward and draws the loop upwardly with it, the thread-finger moves forward to give up the thread, the looper completes its movement to the full line position shown in Fig. 17 where it again pauses, and the loop-spreader 79, which is now in the position shown in Fig. 20, engages the loop, and moving to the position shown in Fig. 18 spreads or opens the loop. The hook of the shuttle then enters the loop and in its rotation carries the loop with it so as to lay the shuttle-thread therein, the loop-spreader returning to its initial position to release the loop. As the shuttle takes the thread, the takeup continues its upward movement and delivers the thread to the shuttle. The thread-lock remains closed during the first part of the thread pulling movement of the shuttle, so that the latter sets the stitch. Before the hook of the shuttle reaches the highest point in its movement, the thread-clamp is unlocked so that the shuttle during the remainder of its thread pulling movement draws out sufficient thread for the next stitch. After the hook has passed its highest point and has partway descended, the clamp again locks the thread and the takeup lever moves downward and takes up the excess thread in the loop. As the shuttle is carrying over the loop in coincidence with the movement of the needle away from the work, the awl again punctures the work and feeds it and the cycle of operations is again carried on as described.

It has been stated that the thread-locking members are mounted upon the presserfoot-lever and that the takeup-lever has always the same length of movement and traverses always the same path. It will be seen however, that, if the presserfoot is raised by an additional thickness of stock, the thread-clamping members move downward toward the thread-guide 85 so that an additional amount of thread is supplied by the thread-lock in accordance with the thickness of the stock for the next stitch.

Having thus explained the nature of the invention, and described a way of constructing and using the same, although without attempting to set forth all of the forms in which it may be made, or all of the modes of its use, I declare that what I claim is:—

1. In a sewing machine, a pair of supports of which one is movable toward and from the other, independent flanged studs mounted one on each support and extending toward the other, said studs having sliding connection one with the other, means for securing each stud to its support, a needle carrier having a bearing hole for the reception of one of said studs, said carrier being mounted on the stud between its flange and support, and an awl carrier having a bearing hole for the reception of the other stud, said awl carrier being mounted on that stud between its flange and support.

2. In a sewing machine, a pair of supports of which one is movable toward and from the other, independent studs attached one on each support and extending toward the other, the end of one stud having a socket to receive the end of the other, an awl carrier having a bearing hole mounted on one stud, a needle carrier having a bearing hole mounted on the other stud, and peripheral flanges formed on said studs between said carriers.

3. In a sewing machine, a needle and its carrier, an awl and its carrier, independent studs on which said carriers are pivoted to oscillate, supports for said studs of which one is movable toward and from the other in a direction parallel to the axis of said studs, sliding connections between the ends of said studs, a sliding connection between said carriers by which they are caused to oscillate in unison, a driving shaft, and a power-transmitting means connecting said shaft with one of said carriers to impart an oscillation thereto.

4. In a sewing machine of the character described, a main shaft and stitch-forming mechanism comprising an oscillatory needle, means actuated by said shaft for operating the needle, a rotary shuttle, a stationary casing for said shuttle, said shuttle and said casing having concentric overlapping lips, a shuttle driving shaft and a shuttle-engaging and driving member arranged concentrically with relation to the axis of said shuttle, and complemental similar gears one on said main shaft and the other on said shuttle driving shaft by which said shuttle driving shaft is rotated synchronously with said main shaft.

5. In a sewing machine, an oscillatory awl carrier, an oscillatory needle carrier, means for supporting the awl carrier and means for supporting the needle carrier, said two means having telescopic engagement with each other and being relatively movable for feeding, the supporting means for the awl carrier having transverse confronting faces engaging the sides of the awl carrier, and the supporting means for the needle carrier having transverse confronting faces engaging the sides of the needle carrier.

6. In a sewing machine, an awl and its carrier, a needle and its carrier, said carrier having bearing holes, supports for said carriers of which one support is movable toward and from the other, alined studs attached to said supports for mounting said carriers on their respective supports, and means for reciprocating the movable support including an arm pivotally mounted on the support, a projection on the arm, and an oscillatory actuator having a slot which is so curved as to be concentric to the pivot of said arm when the movable support is retracted, said slot coöperating with said projection.

7. In a sewing machine, a driving shaft and stitch-forming mechanism comprising a looper-finger, a thread-finger, and mechanisms operated by said shaft for actuating said fingers, said mechanism for operating said looper-finger comprising a spiral driving gear on the driving shaft having two series of teeth separated by peripheral ribs, and a spiral driven gear connected to the looper-finger and having two series of teeth separated by grooves to receive said ribs.

In testimony whereof I have affixed my signature, in presence of two witnesses.

HARRIE A. BALLARD.

Witnesses:
 M. MATHISON,
 E. BATCHELDER.